(12) United States Patent
Matsumoto et al.

(10) Patent No.: US 9,302,306 B2
(45) Date of Patent: Apr. 5, 2016

(54) HOT PRESS MOLD, TEMPERATURE MEASURING DEVICE, AND HOT PRESS MOLDING METHOD

(75) Inventors: Shin'ichiroh Matsumoto, Toyota (JP); Katsuro Goto, Toyokawa (JP); Shinji Ishii, Togo-cho (JP); Takefumi Suzuki, Nisshin (JP); Takahiro Yoshihara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 869 days.

(21) Appl. No.: 13/508,193

(22) PCT Filed: Nov. 9, 2009

(86) PCT No.: PCT/JP2009/005947
§ 371 (c)(1),
(2), (4) Date: May 4, 2012

(87) PCT Pub. No.: WO2011/055416
PCT Pub. Date: May 12, 2011

(65) Prior Publication Data
US 2012/0234069 A1    Sep. 20, 2012

(51) Int. Cl.
*B21D 22/00*        (2006.01)
*B21D 22/21*        (2006.01)
(Continued)

(52) U.S. Cl.
CPC ............. *B21D 22/208* (2013.01); *B21D 22/20* (2013.01); *B21D 22/21* (2013.01); *B21D 37/16* (2013.01); *G01K 1/14* (2013.01); *G01K 1/16* (2013.01)

(58) Field of Classification Search
CPC ...... B21D 22/21; B21D 37/16; B21D 22/208; B21D 22/20; G01K 1/16; G01K 1/14
USPC ........... 72/342.1, 342.94; 126/39 G; 374/163, 374/179, 208
See application file for complete search history.

(56) References Cited

U.S. PATENT DOCUMENTS 7,708,844 B2 *    5/2010    Muramatsu ............ B21D 37/01
                                                        148/557

FOREIGN PATENT DOCUMENTS

JP    54 150179        11/1979
JP    55028480 A   *   2/1980
(Continued)

OTHER PUBLICATIONS

Machine translation of JP-2005-199300.*
(Continued)

*Primary Examiner* — Shelley Self
*Assistant Examiner* — Mohammad I Yusuf
(74) *Attorney, Agent, or Firm* — Oblon, McClelland, Maier & Neustadt, L.L.P.

(57) ABSTRACT

Provided is a technique which can, in order to guarantee the molding accuracy of hot press molding, accurately measure the temperature of a workpiece being subjected to the hot press molding. A hot press mold is a mold used for hot press molding for hardening and molding a workpiece, which has been heated, by pressing the workpiece. The hot press mold is provided with a stroke type temperature measuring device which is extended and retracted by a pressing force applied thereto through the workpiece. The temperature measuring device is provided in such a manner that the temperature measuring device protrudes outward from the molding surface of the mold, and when subjected to the pressing force applied through the workpiece while being in contact with the workpiece, the temperature measuring device shortens in length and retracts into the mold. It is preferable that the temperature measuring device is provided with a first elastic member and a second elastic member which shorten in length when subjected to the pressing force applied through the workpiece, and that the temperature measuring device is extended and retracted in two stages by means of the first elastic member and the second elastic member.

4 Claims, 11 Drawing Sheets

(51) Int. Cl.
*B21D 37/16* (2006.01)
*G01K 1/14* (2006.01)
*G01K 1/16* (2006.01)
*B21D 22/20* (2006.01)

(56) References Cited

FOREIGN PATENT DOCUMENTS

| JP | 4 135018 | 5/1992 |
| JP | 2005 199300 | 7/2005 |
| JP | 2006 300649 | 11/2006 |
| JP | 2009 220141 | 10/2009 |

OTHER PUBLICATIONS

Machine translation of JP-2009-220141.*
International Search Report Issued on Dec. 8, 2009 in PCT/JP09/005947 Filed Nov. 9, 2009.

* cited by examiner

HOT PRESS MOLD, TEMPERATURE MEASURING DEVICE, AND HOT PRESS MOLDING METHOD

TECHNICAL FIELD

The present invention relates to a technique of hot press molding, in which a workpiece that is heated beforehand is quenched and molded, and particularly to a technique of continuously measuring the temperature of the workpiece during the hot press molding, whereby accuracy of quenching and molding are improved.

BACKGROUND ART

The hot press molding is widely known, in which the workpiece is heated to the predetermined temperature and put in to the mold, and the workpiece is kept in contact with the mold, thereby quenching and molding the workpiece into the desired shape.

The molding accuracy of the hot press molding (dimensional accuracy, quenchability and the like) is determined by the cooling gradient while quenching (cooling speed). Thus, measuring the temperature of the hot press mold and the workpiece in the mold and controlling the temperature are required as an important technique.

For example, JP 2005-199300 A discloses a temperature sensor which is disposed at the surface of the mold and measures the temperature of the workpiece, and a technique of controlling the motion speed of the pressing apparatus which actuates the mold on the basis of the measured temperature.

Due to the technique of JP 2005-199300 A, the temperature data detected by the temperature sensor allows control of the temperature of the workpiece under hot press molding. However, there are various problems with arrangement of the temperature sensor.

(1) If the temperature sensor is a contact sensor, the temperature sensor is arranged projecting outward from the molding surface. In such case, the surface accuracy is degraded because of the projection and therefore the molding accuracy goes down. Moreover, the temperature sensor is easily broken by the impact of the pressure. (2) If the temperature sensor is a non-contact sensor, it is difficult to accurately measure the rapid change in temperature of the workpiece (rapid cooling in quenching), and if the non-contact sensor is a precision measuring equipment such as an infrared radiation thermometer, there is a problem with the durability against impact pressure.

As mentioned above, the conventional technique did not solve the practical problems about the measurement of the temperature of the workpiece while hot press molding. Therefore, the quality of the entire molded product is not guaranteed.

Further, in the conventional hot press molding, the workpieces are continuously put in and the hot press molding is continuously operated. The quenching process causes the increase of the temperature of the mold. When the temperature of the mold is increased above the cooling capability thereof, the mold would not be cooled down, so that the cooling speed for quenching (the enough temperature difference between the mold and the workpiece) is not satisfied and the quenching defect may occur. In the case where the quenching defect occurs, it is difficult to determine when the defect occurs, and thereby all of the molded products made by the same processes should be checked. Accordingly, there is a practical problem remained.

SUMMARY OF INVENTION

Technical Problem

The present invention provides a technique capable of accurately measuring the temperature of the workpiece during the hot press molding in order to guarantee the molding accuracy.

Technical Solution

A hot press mold according to the present invention is used for pressing a heated workpiece, thereby molding and quenching the workpiece and includes a temperature measuring device configured as a stroke sensor elongating/contracting by the pressure added via the workpiece. The temperature measuring device is arranged to project outward from a molding surface of the mold, and when the workpiece is in contact therewith, the measuring device contracts and goes into the mold in response to the pressure from the workpiece.

In the advantageous embodiment of the hot press mold, the temperature measuring device further includes first and second elastic members, each of which contacts by the pressure from the workpiece, and the temperature measuring device elongates/contacts in two steps by the first and second elastic members.

Preferably, the temperature measuring device further includes: a thermocouple for measuring the temperature of the workpiece, arranged at the head; a protector disposed between the workpiece and the thermocouple to prevent the direct contact therebetween; a supporter for the thermocouple and the protector; and a fixing portion supporting the supporter, used for attaching the temperature measuring device to the mold. The first elastic member is disposed at the supporter to bias the protector toward the head side, the second elastic member is disposed at the fixing portion to bias the supporter toward the head side, and the spring constant of the first elastic member is smaller than that of the second elastic member.

More preferably, the mold has a corner to bend the workpiece, and the temperature measuring device is arranged at the corner or the vicinity thereof.

A temperature measuring device according to the present invention is installed in a hot press mold for pressing a heated workpiece, thereby molding and quenching the workpiece, measuring the temperature of the workpiece while hot press molding. The temperature measuring device includes: a thermocouple for measuring the temperature of the workpiece, arranged at the head; a protector disposed between the workpiece and the thermocouple to prevent the direct contact therebetween; a supporter for the thermocouple and the protector; a first elastic member disposed at the supporter, biasing the protector toward the head side; a fixing portion supporting the supporter, used for attaching the temperature measuring device to the mold; and a second elastic member disposed at the fixing member, biasing the supporter toward the head side. The spring constant of the first elastic member is smaller than that of the second elastic member, and when the pressure from the workpiece is added to the protector, the first elastic member contracts faster than the second elastic member.

Advantageously, the temperature measuring device further includes an adjuster for adjusting the distance between a molding surface of the mold and the thermocouple, and when the temperature measuring device is attached to the mold, the adjuster is used to arrange the thermocouple to project by a predetermined length from the molding surface.

A hot press molding method according to the present invention is used for pressing a heated workpiece, thereby molding and quenching the workpiece. The method includes: measuring a temperature of the workpiece while hot press molding by using a contact sensor; calculating a cooling gradient of the workpiece in quenching on the basis of the measured temperature; checking go/no-go of the hot press molding on the basis of the calculated cooling gradient, and determining which process includes a defect; and feeding back the determination of the defect to the process.

Advantageous Effects of Invention

According to the embodiment of the present invention, the temperature of the workpiece under the hot press molding is accurately measured. Moreover, the molding accuracy of the hot press molding is guaranteed.

EXPLANATION OF NUMERALS

1: hot press mold,
2: workpiece,
10: fixed mold,
11: molding surface,
20: movable mold,
21: molding surface,
30: temperature sensor (temperature measuring device),
51: first elastic member,
52: second elastic member

DESCRIPTION OF EMBODIMENTS

Referring to attached drawings, a hot press mold 1 (hereinafter, simply called "mold 1") that is an embodiment of a hot press molding according to the present invention is described below.

Figure 1:
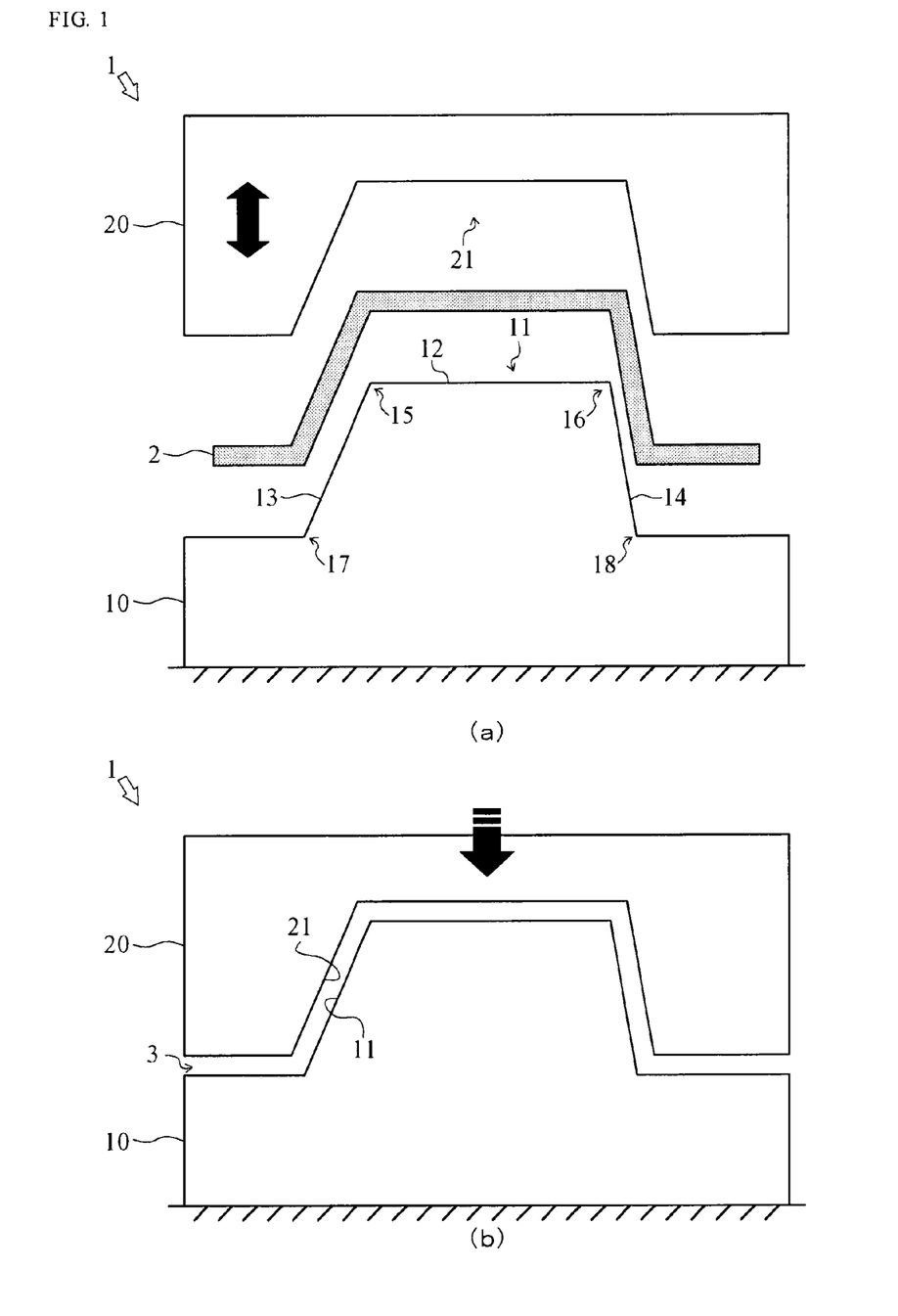
FIG. 1 schematically illustrates a hot press mold.

In this description, the upper-lower direction of FIG. 1 is defined as the upper-lower direction (the direction of gravity) of the mold 1.

The mold 1 is used for hot press molding of a workpiece 2. The workpiece 2 that is heated to a predetermined temperature (e.g., around 600 to 900° C.) is put into the mold 1 and kept in touch with the mold surface of the mold 1, whereby the mold 1 quenches the workpiece 2 by cooling faster than the predetermined speed and forms the workpiece 2 into the desired shape.

The workpiece 2 is a plate member made of quenchable metal, for example, steel, high-tension steel, or ultra-high strength steel. The workpiece 2 is evenly heated above the predetermined temperature (e.g., the austenitizing temperature) in the previous heating process of the hot press molding process. The heating process is followed by the hot press molding process, and after the hot press molding process, the workpiece 2 is transferred to subsequence processes such as a trimming process and the like, whereby the workpiece is applicable to automobile or architecture as a structural component having a desired property (e.g., quenching strength).

As illustrated in FIG. 1, the mold 1 includes a pair of a fixed mold 10 and a movable mold 20. In the mold 1, the fixed mold 10 is disposed below the movable mold 20, and the pressing direction is set in the upper-lower direction.

The fixed mold 10 is mounted on the stable surface such as floor. The fixed mold 10 has a molding surface 11 facing the movable mold 20 (at the upper surface in drawings). The molding surface 11 has a top 12 as the top flat surface thereof on which the workpiece 2 is laid. The molding surface 11 has wall surfaces 13 and 14 continuing to the top 12 and inclining to the top 12. The wall surfaces 13 and 14 are formed as surfaces inclined toward the pressing direction of the mold 1 or substantially parallel to the pressing direction.

In the fixed mold 10, there are top corners 15 and 16 between the wall surfaces 13 and 14 and the top 12, respectively, and the bottoms of the wall surfaces 13 and 14 are formed as bottom corners 17 and 18, respectively.

The movable mold 20 is installed in a transferring apparatus such as a pressing apparatus. The movable mold 20 moves in the approaching/separating direction with respect to the fixed mold 10 by actuating the transferring apparatus. The movable mold 20 has a molding surface 21 corresponding to the molding surface 11, facing the fixed mold 10 (at the lower surface in drawings).

In the mold 1, when the movable mold 20 moves to the lower dead center (closing the mold), there is a clearance (that is approximately equals to the thickness of the workpiece 2) between the molding surfaces 11 and 21. The molding surfaces 11 and 21 have the predetermined shapes, and the clearance between the molding surfaces 11 and 21 is defined as a cavity 3 with the predetermined shape.

The cavity 3 is formed in the desired shape, and the workpiece 2 is pressed and formed along the cavity shape during the closing operation of the mold 1.

Figure 2:
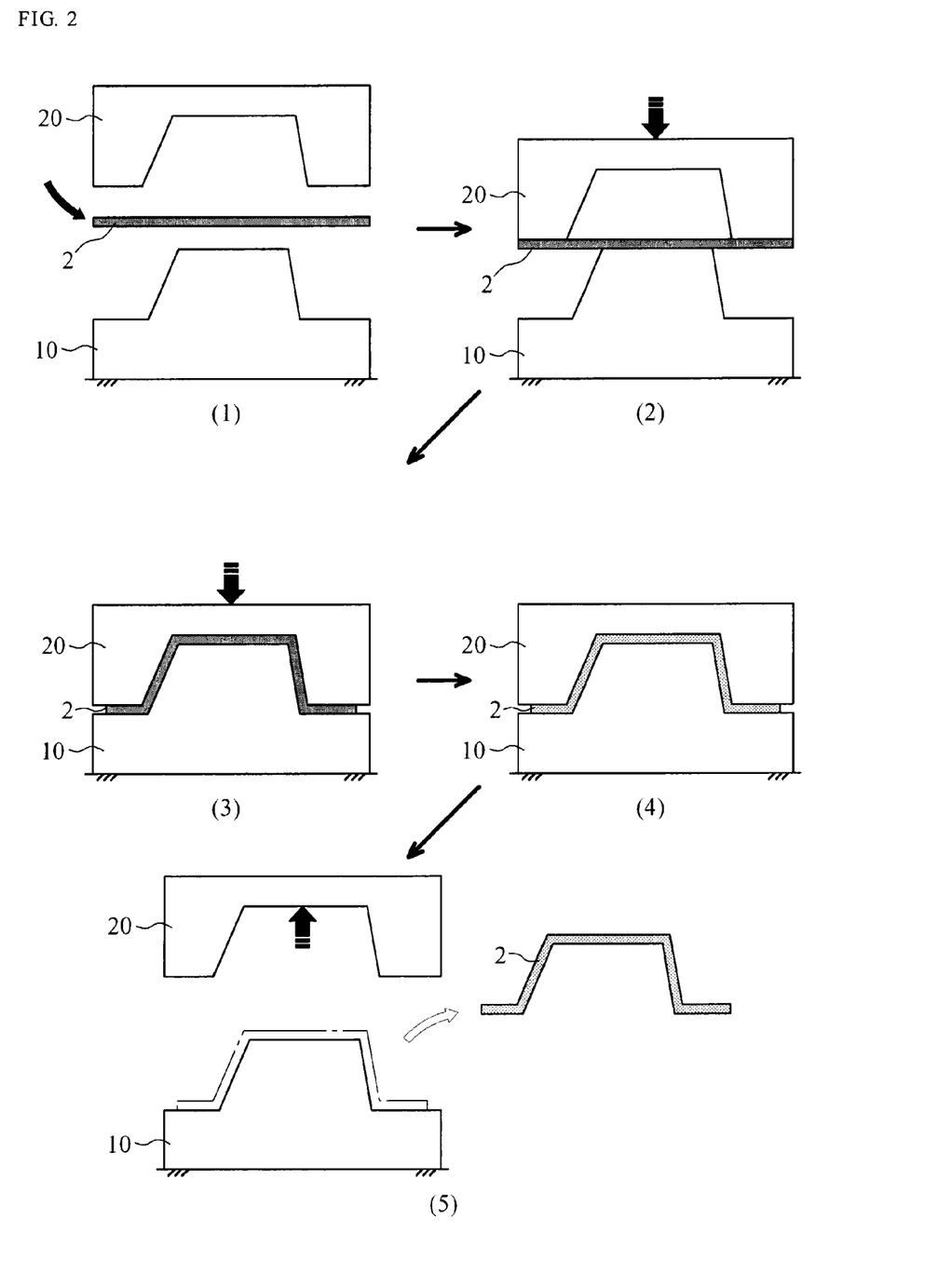
FIG. 2 illustrates a hot press molding using the hot press mold.

Using the mold 1, the hot press molding process is operated under the procedures (1) to (5) described below (illustrated in FIG. 2).

(1) The heated workpiece 2 is laid on the top of the fixed mold 10, (2) the movable mold 20 approaches the fixed mold 10, (3) the movable mold 20 moves to the lower dead center, with pressing and forming the workpiece 2, (4) the movable mold 20 stays at the lower dead center for the predetermined interval, and the workpiece 2 is quenched by contacting the mold 1, and (5) the movable mold 20 is separated from the fixed mold 10 and the workpiece 2 is removed.

It should be notable that the apparatus for casting the workpiece 2 into the mold 1 and the apparatus for removing the workpiece 2 are, for example, installed in the conventional transferring robot including the workpiece holder such as robot hands.

Referring to FIGS. 3 to 7, a temperature sensor 30 as one embodiment of the temperature measuring apparatus of the invention is described.

Figure 3:
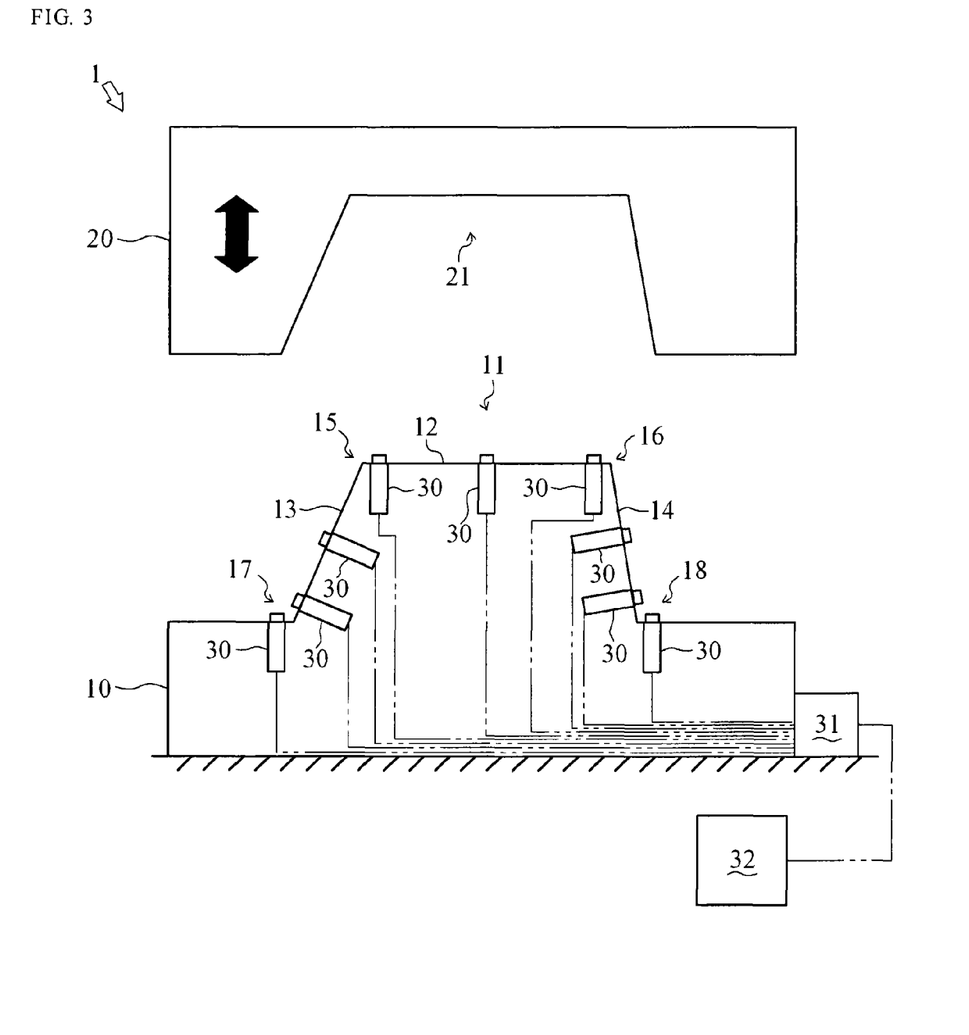
FIG. 3 illustrates temperature sensors arranged in the hot press mold.

The temperature sensor 30 contacts the workpiece 2 put into the mold 1 and measures the temperature in the contact point. The temperature sensor 30 is installed in the mold 1.

As depicted in FIG. 3, the multiple temperature sensors 30 are installed at the multiple points in the fixed mold 10, with the measuring head of the sensors projecting outside of the fixed mold 10.

More specifically, as shown in FIG. 3, the temperature sensors 30 are disposed at the top 12, in the vicinity of the corners 15, 16, 17 and 18, and at the center of the wall surfaces 13 and 14.

The output wires of the temperature sensors 30 are connected to a terminal block 31, and through the terminal block the output wires are connected to a memory device 32 such as a data logger. The measured temperature data are transmitted to the memory device 32.

The terminal block 31 gathers the wires from the temperature sensors 30 and outputs the data to the memory device 32. The terminal block 31 transmits the temperature data measured by the temperature sensors 30 to the memory device 32.

The memory device 32 memorizes the temperature data transmitted from the temperature sensors 30 via the terminal block 31, and stores as the time-series data (temperature data with elapsed time from the start of hot press molding) associated with each of the measuring points of the workpiece 2. The memory device 32 is connected to a display device for displaying the measured temperature data.

Some of the temperature sensors 30 are preferably arranged in the fixed mold 10 at the positions of the workpiece 2 where it is important to know whether the quenching is operated or not. In other words, the temperature sensors 30 are arranged to measure the temperature at the positions which determine the quality of the workpiece 2 (where the temperature history should be controlled).

For instance, if the workpiece 2 is press and bent as the present embodiment, the temperature sensors 30 are arranged at the corners 15, 16, 17 and 18 formed in the fixed mold 10, or in the vicinity thereof.

In this case, the temperatures in the bent portions of the workpiece 2 are controllable where the cracks or wrinkles during the press molding or the springback after the press molding may occur. Thereby, it is possible to check whether the quenching is operated or not at those portions. Hence, the quality of the workpiece 2 is guaranteed.

In the embodiment, "in the vicinity of the corners 15, 16, 17 and 18" means the portions adjacent to the curved portion or bent portion of each corner. At those portions, the temperatures are substantially same as the corners due to the heat transfer.

Some of the temperature sensors 30 are preferably arranged in the fixed mold 10 to unfailingly touch the workpiece 2 in the press molding process. In other words, the temperature sensor 30 is arranged to measure the temperature without being affected by the manufacturing error such as the thickness error of the workpiece 2.

In the embodiment, one of the temperature sensors 30 is arranged in the top 12 of the fixed mold 10 which is configured as the flat surface (perpendicular to the pressing direction of the mold 1 and the surface on which the workpiece 2 is laid), and therefore, the temperature sensor 30 contacts the workpiece 2 when the workpiece 2 is set on the fixed mold 10.

Due to the structure, it is possible to determine the heating condition of the workpiece 2 such as whether the workpiece is heated above the predetermined temperature in the heating process before the hot press molding process, and whether the workpiece is heated uniformly or not by measuring the temperature at the point where the heating is difficult. As a result, the quality of the workpiece 2 is assured.

Some of the temperature sensors 30 are preferably arranged in the fixed mold 10 at the positions where the workpiece 2 is not easy to contact during the press molding. In other words, the temperature sensors 30 are arranged in the portions where the contact timing with the workpiece 2 is late in the bending process of the workpiece 2 by the mold 1, and thereby the measurement of the temperature is difficult.

In the embodiment, the temperature sensors 30 are disposed at the wall surfaces 13 and 14 of the fixed mold 10 which are configured as standing surfaces and the temperature sensors 30 contact the workpiece 2 when the mold 1 bends the workpiece during the hot press molding process.

Therefore, the quenching conditions, such as whether the workpiece 2 is quenched in the hot press molding process or not, are determined, and the quality of the workpiece 2 is guaranteed.

Figure 4:
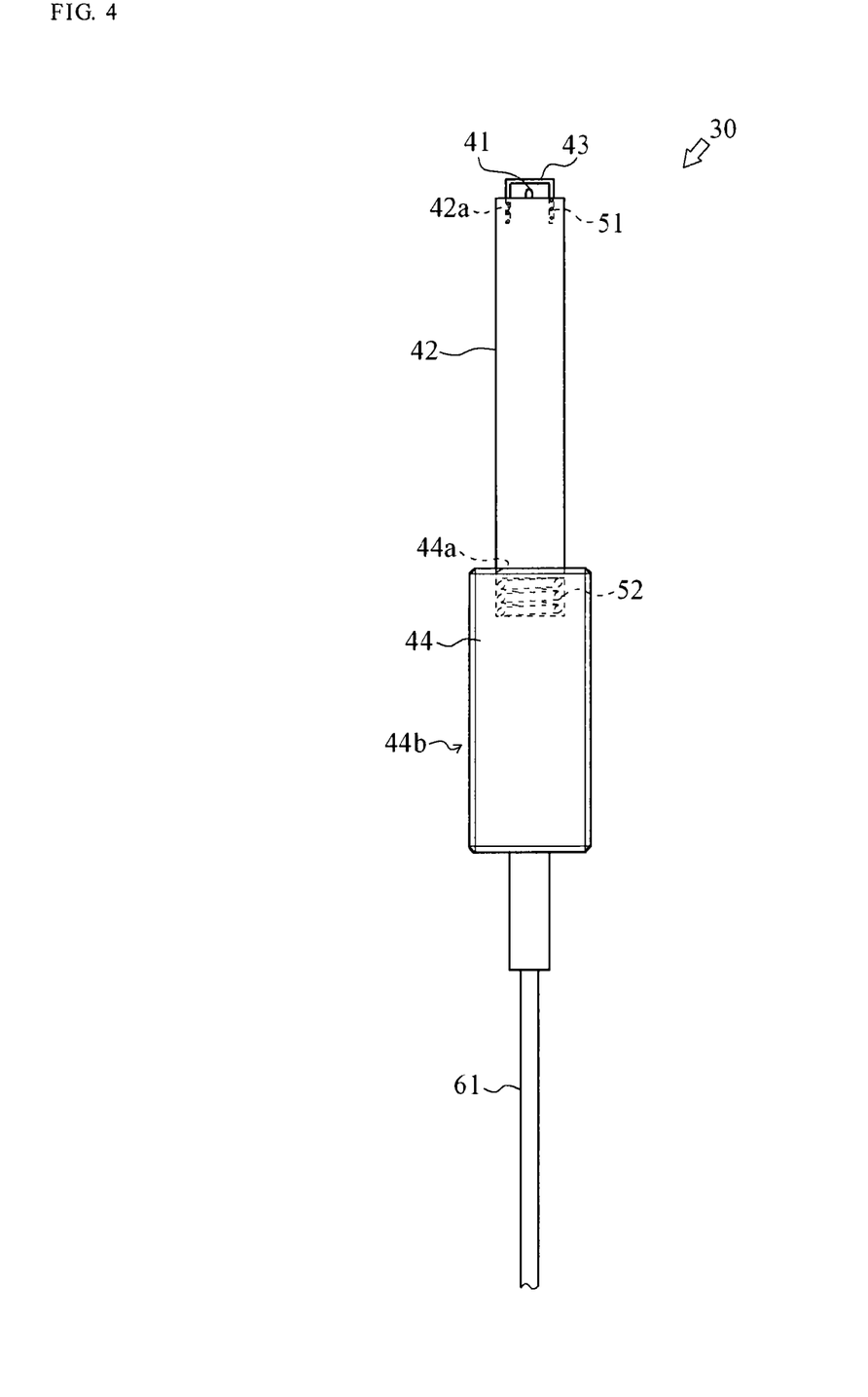
FIG. 4 depicts the temperature sensor.

As depicted in FIG. 4, the temperature sensor 30 includes a thermocouple 41, a pipe 42, a metal plate 43, a fixing portion 44, a first elastic member 51, a second elastic member 52 and a compensation lead wire 61.

The thermocouple 41 is used for measuring the temperature of the object (workpiece 2), and consists of two different metal wires each of which has the measurement range corresponding to the temperature of the workpiece 2 heated to the predetermined temperature (for example, combination of chromel and alumel).

The thermocouple 41 is fixed to project by a predetermined length from the end of the pipe 42, and the junction as measurement point is provided at the tip of the projected portion. At the tip side of the thermocouple 41, the metal plate 43 is disposed touchable to the thermocouple 41.

The thermocouple 41 is connected with the compensation lead wire 61 and connected to the terminal block 31 through the wire 61. The thermocouple 41 measures thermoelectric power, and the memory device 32 detects it through the terminal block 31 as the temperature data of the workpiece 2. Thus detected temperature data of the workpiece 2 is stored in the memory device 32 with information such as the arrangement of the temperature sensor 30 and the elapsed time.

The metal plate 43 is made of metal with high pyroconductivity (e.g., inconel or stainless), and configured as a disc plate having the diameter not larger than that of the pipe 42. The metal plate 43 includes a disc plate portion and a bent portion extended perpendicular to the disc plate portion.

The metal plate 43 is arranged at the end of the temperature sensor 30 and adjacent to the thermocouple 41. When the metal plate 43 contacts the workpiece 2, the metal plate conducts the heat of the workpiece 2 to the thermocouple 41 and protects the thermocouple 41 by preventing the direct contact between the workpiece 2 and the thermocouple.

The pipe 42 supports the thermocouple 41 and the metal plate 43, and configured as cylindrical member made of rigid material such as stainless. Through the pipe 42, the metal wires of the thermocouple 41 (or the compensation lead wire 61 connected to the metal wires) pass.

The pipe 42 is formed with a groove 42a that has a desired depth and a desired diameter (substantially same as the diameter of the metal plate 43).

Figure 5:
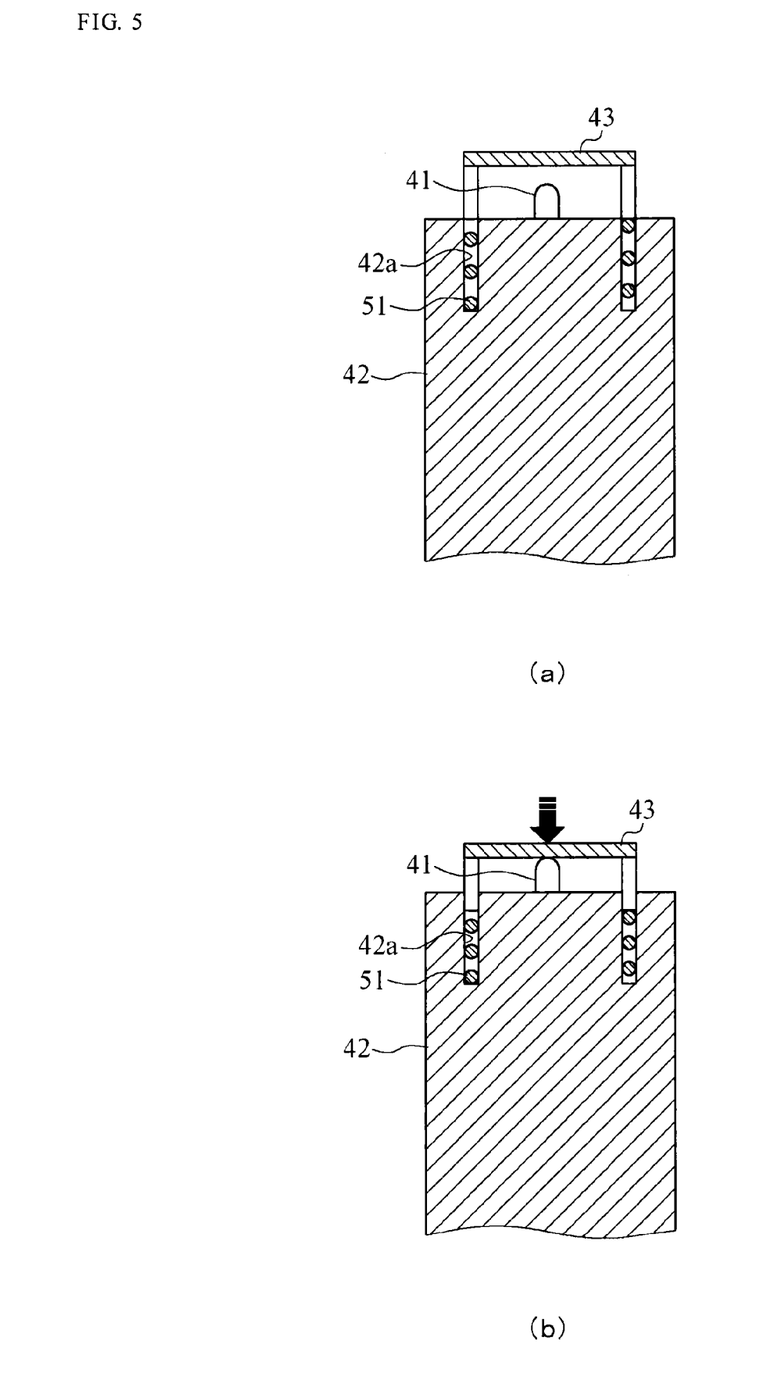
FIG. 5 is a section view showing a stroke structure of the temperature sensor.

As illustrated in FIG. 5, the first elastic member 51 is housed in the groove 42a and the base end of the elastic member 51 is fixed to the bottom of the groove 42a. The other end of the elastic member 51 is fixed to the metal plate 43 (the bent portion of the metal plate 43) that is extended into the groove 42a.

The first elastic member 51 is configured by a coil spring with a predetermined spring constant, biasing the metal plate 43 toward the head side of the temperature sensor. That is, the first elastic member 51 presses the metal plate 43 away from the thermocouple 41.

As described above, at the head of the temperature sensor 30, the metal plate 43, the thermocouple 41 and the pipe 42 are disposed in order from the end, and the metal plate 43 is supported by the pipe 42 via the first elastic member 51.

When the metal plate 43 is in contact with the workpiece 2 and the external force (pressure) acts thereon, the elastic member 51 contracts and the metal plate 43 moves toward the pipe 42, whereby the metal plate 43 touches the thermocouple 41 (see FIG. 5(b)). In such situation, the heat of the workpiece 2 is transmitted to the metal plate 43, and the thermocouple 41 measures the temperature of the metal plate 43, or of the workpiece 2. It should be noted that the stroke of the first elastic member 51 makes the projection length of the temperature sensor 30 from the molding surface 11 of the fixed mold 10 short.

Figure 6:
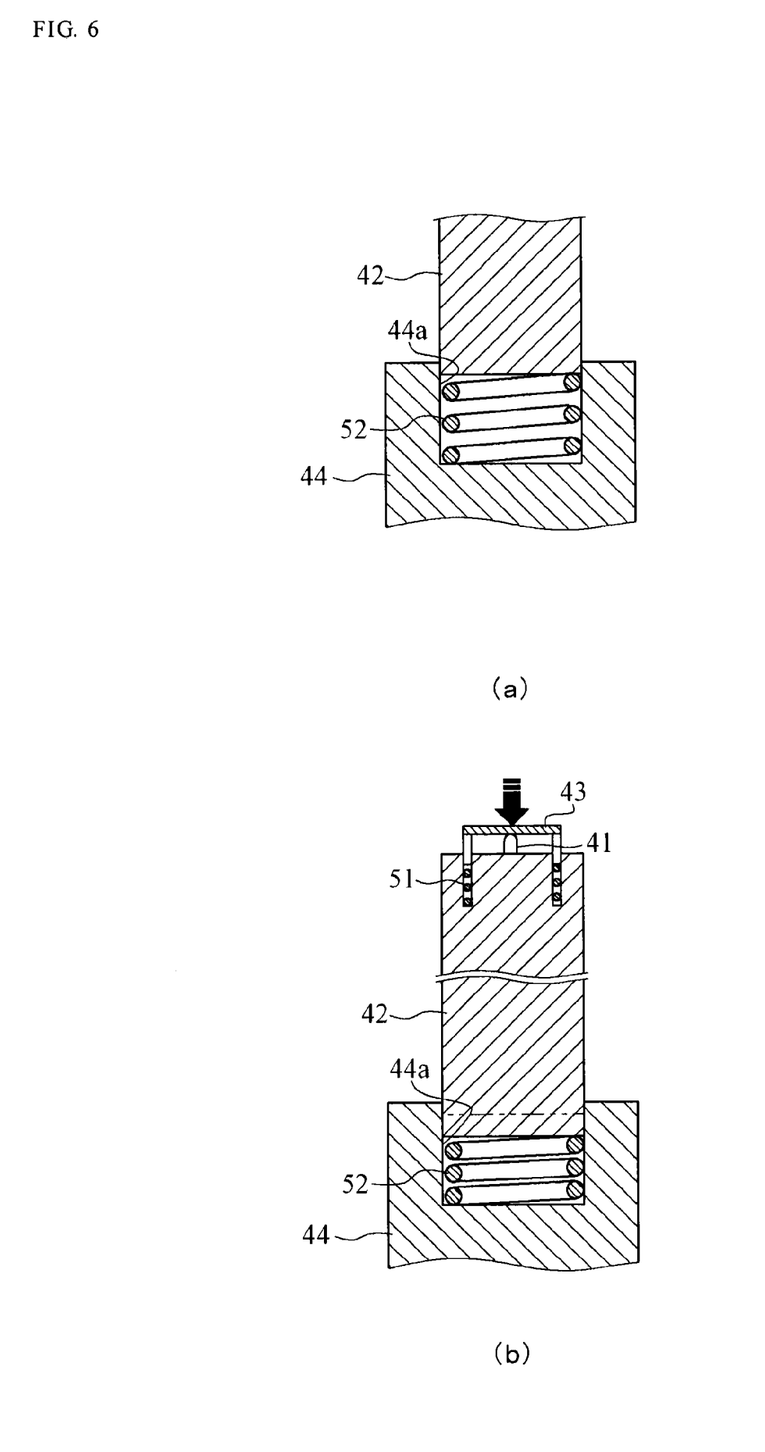
FIG. 6 is a section view showing a stroke structure of the temperature sensor.

As shown in FIGS. 4 and 6, the fixing portion 44 supports the pipe 42 and is configured in the cylindrical shape, and the fixing portion 44 and the pipe 42 are arranged coaxially. The fixing portion 44 is formed with a columnar recess 44a having a desired depth and a desired diameter (substantially same as the outer diameter of the pipe 42), and the pipe 42 is slidably disposed in the recess 44a via the second elastic member 52. The base end of the elastic member 52 is fixed to the bottom of the recess 44a and the other end of the elastic member 52 is fixed to the pipe 42.

The second elastic member 52 is configured by a coil spring with a predetermined spring constant, biasing the pipe 42 toward the head side of the temperature sensor. That is, the second elastic member 52 presses the thermocouple 41, the pipe 42 and the metal plate 43 toward the workpiece 2.

When the external force (pressure) acts on the pipe 42, the elastic member 52 contracts, and the pipe 42 strokes toward the base side of the temperature sensor (see FIG. 6(b)). The contraction of the elastic member 52 makes the projection length of the temperature sensor 30 from the molding surface 11 of the fixed mold 10 short. During the hot press molding, in response to the pressure from the workpiece 2, the temperature sensor completely goes into the fixed mold 10.

The temperature sensor 30, as described above, contracts at two stages in response to the pressure added by the workpiece 2 (molding pressure in the hot press molding).

When performing hot press molding on the workpiece 2 using the mold 1, the movable mold 20 goes down and presses the workpiece 2. Thus, (1) the molding pressure is transmitted to the metal plate 43 and the first elastic member 51 shrinks, which moves the metal plate 43 to the thermocouple 41, and further (2) the pressure is transmitted to the pipe 42, so that the second elastic member 52 shrinks and the pipe 42 moves toward the base side. Thereby, the first and second elastic members 51 and 52 provide the temperature measuring device with two-step stroke.

The head of the temperature sensor 30 is protruded outward from the molding surface 11 of the fixed mold 10 in the initial state, and the protruded part is pressed into the fixed mold 10 when hot press molding. Therefore, the surface accuracy of the molding surface 11 is not affected by the temperature sensors and the molding quality is maintained.

When the temperature sensor 30 goes into the fixed mold 10 under the pressure of the workpiece 2, the second elastic member 52 biases the pipe 42 toward the workpiece 2 so that the thermocouple 41 is kept in contact with the workpiece 2, thereby accurately measuring the temperature of the workpiece 2 during the molding.

The temperature sensor 30, as described above, allows the measurement of the temperature of the workpiece in the hot press mold.

The structure of the first and second elastic members 51 and 52 allows the two-step stroke, so that the impact to the head of the temperature sensor 30 caused by the pressure from the workpiece 2, and the thermocouple 41 is prevented from damage, thereby providing the long life temperature sensor 30.

The initial length of projection of the temperature sensor 30 from the molding surface 11 of the fixed mold 10 can be long, and the temperature sensor 30 surely contacts the workpiece 2, thereby improving the measuring accuracy.

The spring constant of the first elastic member 51 is smaller than that of the second elastic member 52, and the first elastic member 51 is easier to shrink than the second elastic member 52.

When the external force acts on the head of the temperature sensor 30, the first elastic member 51 contracts in first, and the thermocouple 41 unfailingly touches the metal plate 43. In the case that the first elastic member 51 contracts in first, due to the biasing force of the second elastic member 52, the temperature sensor is pressed toward the workpiece 2, maintaining the contact between the metal plate 43 and the thermocouple 41.

Due to the settings of the spring constants of the first and second elastic members 51 and 52, the thermocouple 41 measures the temperature without fail.

Figure 7:
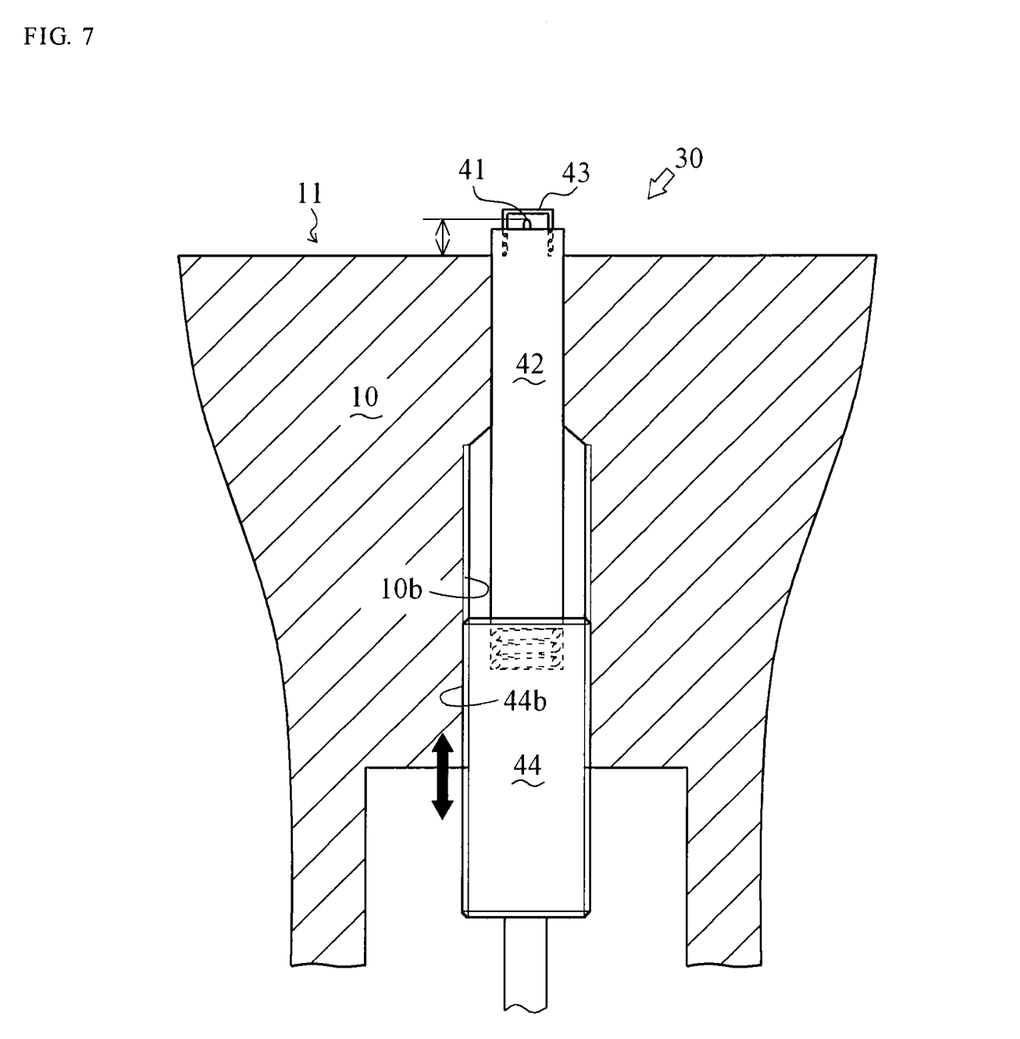
FIG. 7 depicts a fixing structure between the hot press mold and the temperature sensor.

As depicted in FIGS. 4 and 7, the outside of the fixing portion 44 is formed with a male thread 44b. The fixed mold 10 is formed with a female thread 10b corresponding to the male thread 44b where the temperature sensor 30 is installed.

The male thread 44b of the fixing portion 44 is screwed into the female thread 10b of the fixed mold 10, and thus the temperature sensor 30 is fixed to the fixed mold 10, in which the screw amount is adjusted to set the fixing position. So, the initial projection amount of the temperature sensor 30 (thermocouple 41) from the molding surface 11 is adjusted.

Due to the structures of the male thread 44b of the fixing portion 44 and the female thread 10b of the fixed mold 10, the screw amount between the fixing portion 44 and the fixed mold 10 is simply adjusted. So, the position relationship is easily changeable between the thermocouple 41 and the attachment of the fixing portion 44 to the fixed mold 10, and therefore the distance between the thermocouple 41 and the workpiece 2 is easily adjusted. Thus, the temperature sensor 30 keeps the measurement accuracy.

The temperature sensor 30 is easily attached to/detached from the fixed mold 10, thereby improving the workability to attach/detach the temperature sensor 30 and to change the mold 1 or the temperature sensor 30.

The temperature sensor 30 includes the fixing portion 44 formed with the male thread 44b, and the temperature sensor is attached not only to the mold 1 but also to the other equipment having the female thread to which the male thread 44b is screwed.

The temperature sensor 30 is composed of minimum number of parts and has a small diameter, so that the internal configuration of the fixed mold 10, such as a hole drilled for the temperature sensor 30, is minimized. As a result, the internal structure of the fixed mold 10 such as the water passage for cooling the mold is freely designed and the performance of the mold is ensured.

The compensation lead wire 61 has the substantially same thermoelectric property as the metals composing the thermocouple 41. The one end of the wire 61 is connected to the thermocouple 41 via the compensation junction, and the other end is connected to the terminal block 31.

It should be noticed that the compensation lead wire 61 is not indispensable, and, for example the thermocouple 41 may be extended to be connected directly to the terminal block 31. It is selectable whether the lead wire is used or not, in consideration of the cost for the thermocouple 41.

The initial projection amount of the temperature sensor 30 is preferably set in short (not more than 10 [mm]) such that the pipe 42 would not be deformed in the direction perpendicular to the axial direction thereof caused by the pressing pressure and in long (not less than 2 [mm]) such that the metal plate 43 would get in touch with the workpiece 2 during press molding.

The projection direction of the temperature sensor 30 from the molding surface 11, which is the angle of the temperature sensor 30, is advantageously set in the direction perpendicular to the molding surface 11. Thus, the temperature sensor is projected perpendicular to the surface of the workpiece 2 that is press-formed along the molding surface 11, so that the metal plate 43 touches the workpiece 2 in large area. As the result, the temperature sensor 30 can measure without failure.

If the molding surface 11 is inclined to the pressing direction of the mold 1 (e.g., the wall surfaces 13 and 14), the temperature sensor may be more inclined toward the movable mold 20 than the inclined surface, and in such cases, the metal plate 43 may be in contact with the workpiece 2 rapidly and unfailingly. For instance, it is preferable if the workpiece 2 is stroked and bent in the mold 1. In the other embodiment, the metal plate 43 may have a curved surface or bent surface in response to the shape of the workpiece 2, thereby keeping the contact area between the metal plate 43 and the workpiece 2.

Figure 8:
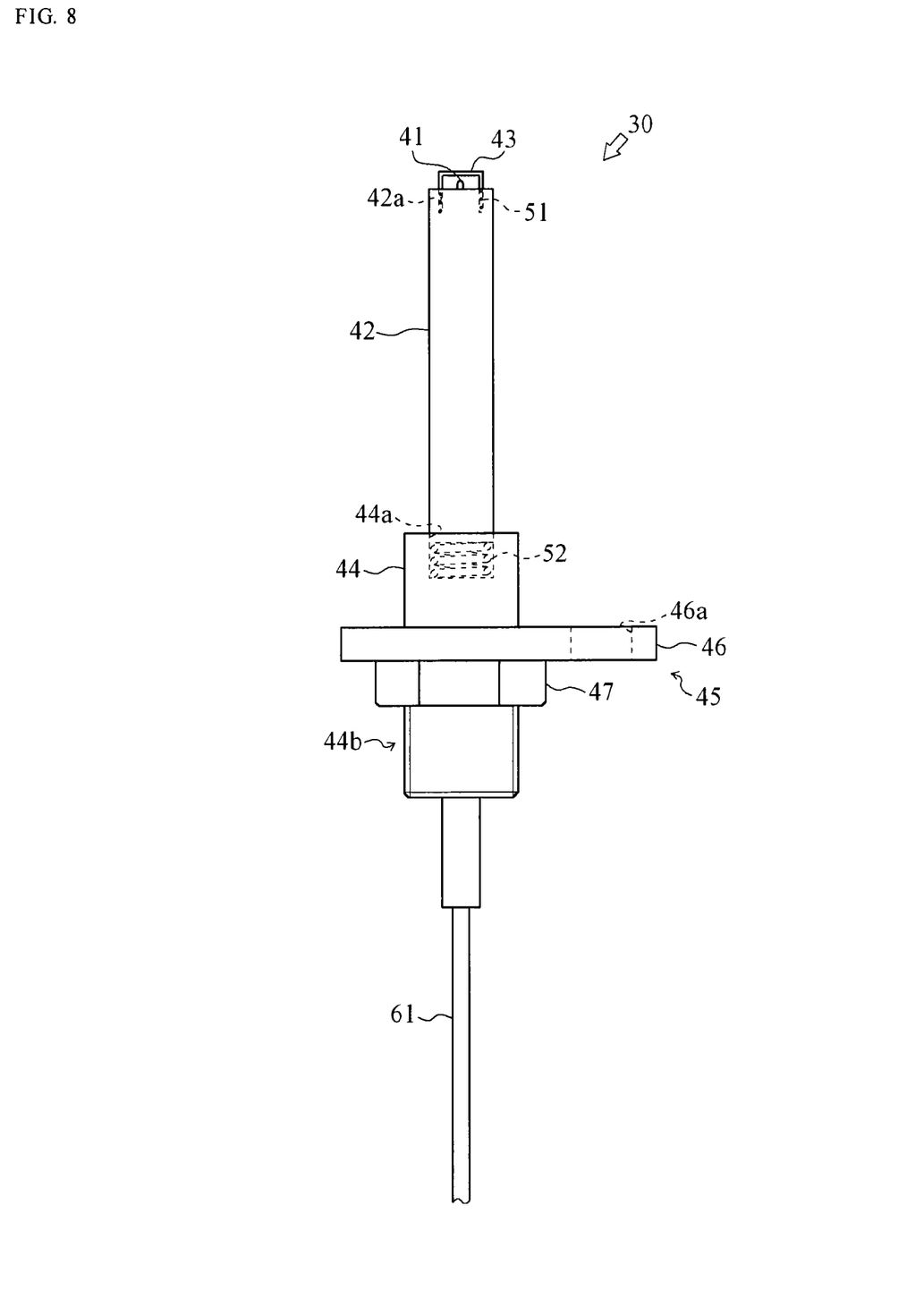
FIG. 8 illustrates an alternative embodiment of the temperature sensor.

FIG. 8 depicts the alternative embodiment of the adjuster in the fixing portion 44, in which the fixing portion is provided with an attachment 45 including a stay 46 and an adjusting bolt 47.

The attachment 45 is used for attaching the temperature sensor 30 to the fixed mold 10, and is supported movably to the fixing portion 44.

The stay 46 is fixed to the fixing portion 44 extended toward the side of the temperature sensor 30. The stay 46 has a bolt hole 46a at the extended portion, and the bolt is screwed into the bolt hole 46a to fix the temperature sensor to the fixed mold 10. In the embodiment, the fixed mold 10 has the bolt holes corresponding to the bolts screwed into the stays 46.

The bolt 47 is screwed into the male thread 44b of the fixing portion 44, and adjusting the screwing amount allows adjusting the fixing position of the stay 46 with respect to the fixing portion 44. Thus, the bolt 47 adjusts the relative position between the stay 46 and the thermocouple 41, that is the distance between the molding surface 11 of the fixed mold 10 and the thermocouple 41 (initial projection amount of the temperature sensor 30).

Figure 9:
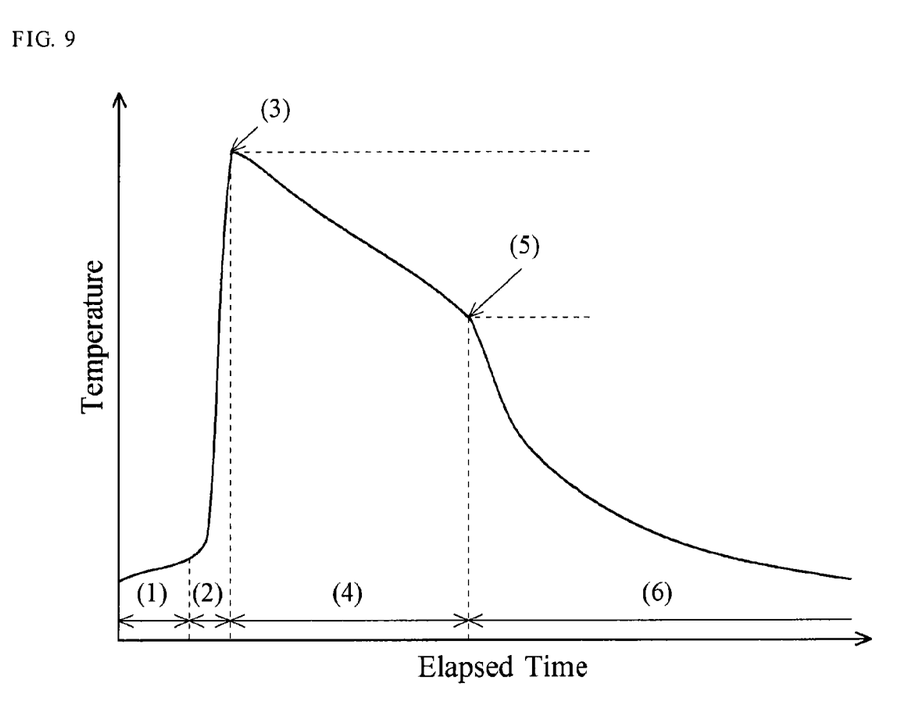
FIG. 9 is a map showing the measurement result of the temperature sensor.

Referring to FIG. 9, the measurement of the temperature of the mold 1 in the hot press molding process using the temperature sensor 30 I described below.

FIG. 9 is a map of the measurement result stored in the memory device 32 and measured by one of the temperature sensors 30 during the hot press molding of the workpiece 2 using the mold 1. In FIG. 9, the horizontal axis is the elapsed time, and the vertical axis is the temperature.

When operating the hot press molding, the measurement of the temperature is performed in the following steps (1) to (6) in order.

(1) When the mold 1 is open, the temperature sensors 30 measure the surface temperature of the mold 1 and the temperature of the atmosphere around the mold 1.

In accordance with the positions of the temperature sensors 30, the surface temperature of the mold 1 may be detected as the difference in temperature between the workpiece 2 and the mold.

(2) The workpiece 2 is put in the mold 1 and laid on the fixed mold 10. Due to the weight of the workpiece 2, the workpiece 2 is in contact with the thermocouples 41 via the metal plates 43 of the temperature sensors 30 disposed in the top 12. The initial temperature of the workpiece 2 is measured with these temperature sensors 30 on the top 12.

The temperature sensors 30 which are not disposed on the top 12 measure the surface temperature of the mold 1 or the temperature of the atmosphere around the surface of the mold 1. These sensors 30 start measuring the temperature of the workpiece 2 after the movable mold 20 moves to close the mold.

(3) When the movable mold 20 reaches the lower dead center, the hot press molding (quenching and press-forming with the mold 1) starts. At the same time, workpiece 2 applies the pressure to the metal plate 43 of the sensor 30, and the first and second elastic members 51 and 52 contract. Thus, the thermocouples 41 touch the workpiece 2 through the metal plates 43, thereby starting the measurement of the temperature of the workpiece 2 with the sensors 30.

(4) Keeping the movable mold 1 at the lower dead center for the predetermined time, the heat of the workpiece 2 is forcedly transmitted to the mold 1, thereby quenching the workpiece 2.

(5) Moving the movable mold 20 upwardly, the workpiece 2 is removed from the mold 1. (6) After the workpiece 2 is removed, the mold 1 remains untouched for a predetermined time, and is cooled by natural cooling and water cooling.

As to the hot press molding, in which the quenching is operated in the mold 1, the quality of workpiece 2 is affected by cooling gradient ([temperature decrease]/[molding time]) in quenching (as above-described in (4)).

The characteristic of the hardness after quenching is generally determined using CCT (Continuous Cooling Transformation) line. CCT line shows a relationship between the cooling gradient in quenching and the hardness after quenching, and the each material to be quenched (workpiece 2) has a unique CCT line.

Figure 10:
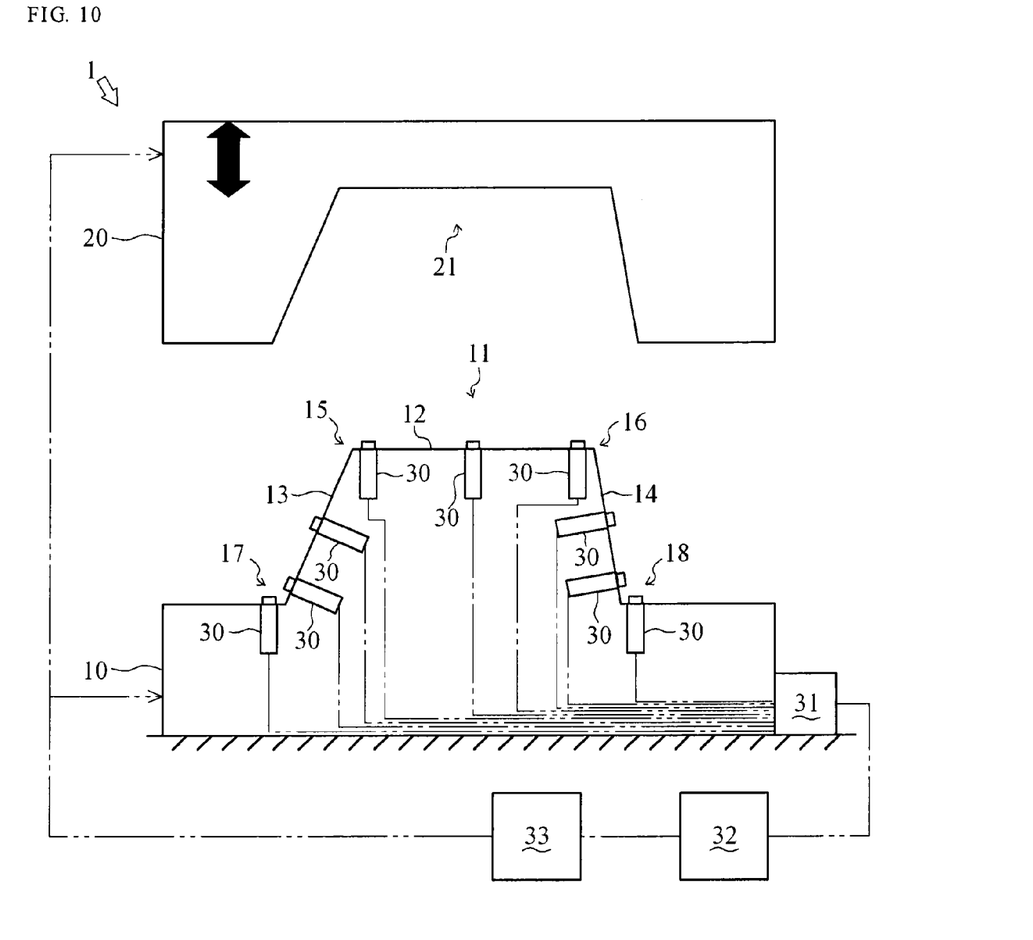
FIG. 10 illustrates the hot press mold provided with a control device.

As illustrated in FIG. 10, the mold 1 further includes a control device 33. The control device 33 controls the mold 1 in the hot press molding process to guarantee the quality of the workpiece 2.

The control device 33 is, for example, a PC with a memory device, a calculation device and a display device. The control device is connected to the memory device 32 and the pressing apparatus actuating the movable mold 20.

The control device 33 receives the temperature data detected by the temperature sensors 30 through the memory device 32. The control device 33 controls the movable mold 20 on the basis of the temperature data, and the control device controls the hot press molding with the mold 1, or displays the failure of the mold 1 or workpiece 2 and stops the hot press molding process.

Figure 11:
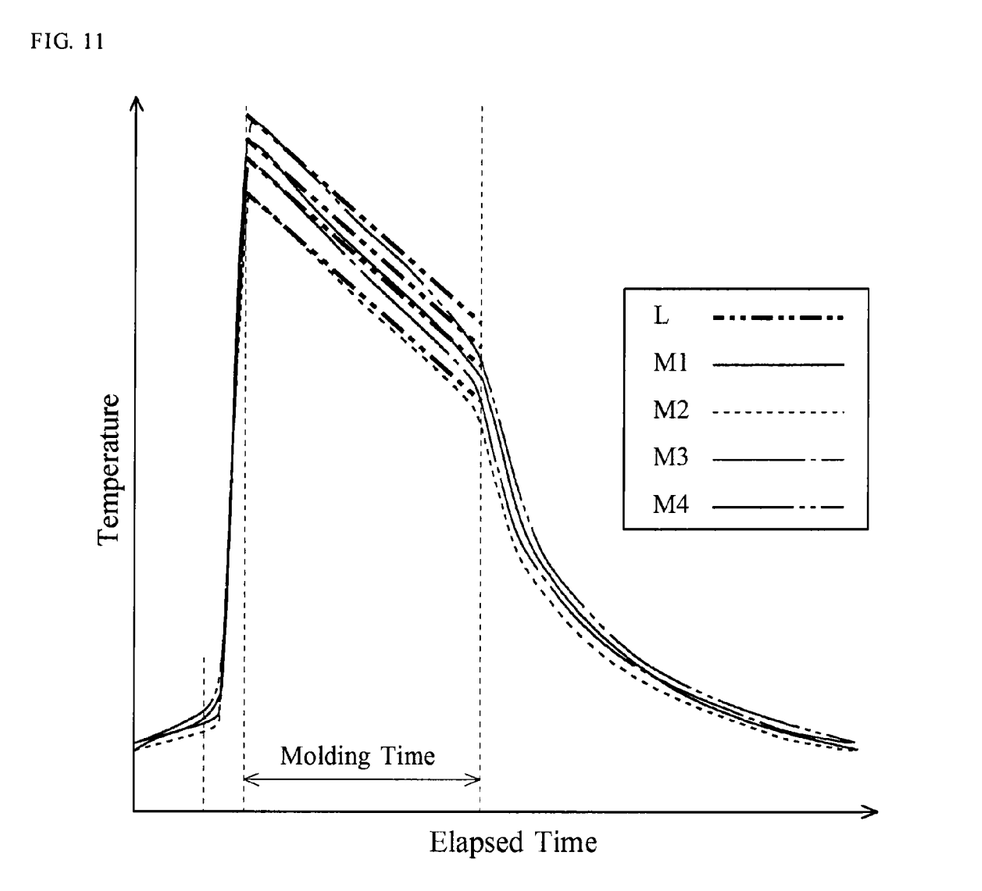
FIG. 11 is a map showing the comparison among the measurement results and the master lines of the cooling gradient.

The control device 33 memorizes the CCT lines regarding the workpiece 2, and, as shown in FIG. 11, defines master lines (L) having optimum cooling gradient, considering the material characteristic or usage of the workpiece 2.

In the control device, the temperature maps (M1, M2, and so on) are made on the basis of the temperature data detected by the temperature sensors 30, each of which is arranged at the position (P1, P2, and so on) of the workpiece 2. The difference (e.g., in gradient) between the temperature maps and the master lines, are determined respectively.

The control device 33 calculates the expected hardness after hot press molding at the positions (P1, P2, and so on) based on the gradient difference, and checks go/no-go for the molding quality. For instance, setting a threshold, the difference between the threshold and the gradient difference is used for the check. Alternatively, if the expected hardness at a particular point (e.g., the corner of the workpiece 2) is less than a desired value, the workpiece is determined as failure.

In the embodiment, the measurement of the temperature and the check of the molding accuracy are performed on all the workpieces 2 put into the mold 1 and on which the hot press molding is operated. Accordingly, if the defects occur in the molding process, it is possible to take proper means.

The proper means is, for example, to control (increase) the flow amount of the cooling water passing through the proximity of the defective portion in order to meet the required cooling gradient, or to quit the molding by actuating the pressing apparatus and remove the defective workpiece 2.

As the result, the quality of all the workpiece 2 molded by the mold 1 is guaranteed.

The change of the temperature of the workpiece 2 is continuously measured during the hot press molding, so that it is possible to determine when the defect occurs. Furthermore, the determination is used as feedback for the hot press molding process or the previous processes such as heating process, manufacturing process of the workpiece or designing process of the mold.

For example, in the case that the mold 1 is high temperature at the start of the molding, which causes the decrease of the cooling gradient in quenching (above described step (1)), the determination of the defect is fed back to the hot press molding process. In the case that the workpiece 2 has a heating defect and it is detected when the workpiece is laid on the mold (above described step (2)), the determination of the defect is fed back to the heating process of the workpiece. In the case that the workpiece 2 has a portion where the cooling gradient is lower than the desired value (above described step (4)), the determination of the defect is fed back to the manufacturing process of the mold 1 to improve the cooling performance at the portion. These feedbacks contribute to the quality assurance of the hot press molding, in which the workpiece 2 is molded with the mold 1.

The temperature measuring device of the invention may be used in a casting mold as well as in the hot press mold 1. In other words, the temperature measuring device is applicable to the molds requiring the temperature control for the workpiece.

Moreover, the temperature measuring device (temperature sensor 30) may be arranged not only in the fixed mold 10 but also in the movable mold 20. That is, the temperature sensors can be arranged to the surface (molding surface 11 or 21) which touches the workpiece 2 when the mold is closed or the hot press molding is operated.

In the other embodiment, the temperature sensor 30 may be disposed at the transferring device for putting the workpiece 2 into the mold 1 in order to detect the heating condition of the workpiece 2. In this case, the measurement of the temperature is performed in the heating process before the hot press molding process, so that the moldability of the workpiece 2 in the hot press molding process is guaranteed.

INDUSTRIAL APPLICABILITY

The present invention is applicable to a mold for molding a workpiece of high temperature, and particularly to a hot press molding, in which the workpiece previously heated is thrown in to the mold and is cooled and quenched in the press molding.

The invention claimed is:

1. A hot press mold for pressing a heated workpiece, thereby molding and quenching the workpiece, comprising:
   a temperature measuring device configured as a stroke sensor elongating/contracting by a pressure added via the workpiece,
   wherein the temperature measuring device is arranged to project outward from a molding surface of the mold, and when the workpiece is in contact therewith, the measuring device contracts and goes into the mold in response to the pressure from the workpiece,
   wherein the temperature measuring device comprises:
      first and second elastic members, each of which contracts by the pressure from the workpiece;
      a thermocouple for measuring the temperature of the workpiece, arranged at a tip end of the temperature measuring device;
      a protector disposed between the workpiece and the thermocouple to prevent a direct contact therebetween;
      a supporter for the thermocouple and the protector; and
      a fixing portion supporting the supporter, used for attaching the temperature measuring device to the mold,
   wherein the first elastic member is disposed at the supporter to bias the protector toward the tip end,
   wherein the second elastic member is disposed at the fixing portion to bias the supporter toward the tip end,
   wherein a spring constant of the first elastic member is smaller than that of the second elastic member,
   wherein the temperature measuring device elongates/contacts in two steps by the first and second elastic members, and
   wherein the protector is made of metal with high pyroconductivity and the protector is configured to conduct a heat of the workpiece to the thermocouple by contacting the workpiece.

2. The hot press mold according to claim 1,
   wherein the mold has a corner to bend the workpiece, and
   wherein the temperature measuring device is arranged at the corner or a vicinity thereof.

3. A temperature measuring device installed in a hot press mold for pressing a heated workpiece, thereby molding and quenching the workpiece, measuring the temperature of the workpiece while hot press molding, the device comprising:
   a thermocouple for measuring the temperature of the workpiece, arranged at a tip end of the temperature measuring device;
   a protector disposed between the workpiece and the thermocouple to prevent a direct contact therebetween;
   a supporter for the thermocouple and the protector;
   a first elastic member disposed at the supporter, biasing the protector toward the tip end;
   a fixing portion supporting the supporter, used for attaching the temperature measuring device to the mold; and
   a second elastic member disposed at the fixing portion, biasing the supporter toward the tip end,
   wherein a spring constant of the first elastic member is smaller than that of the second elastic member,
   wherein when a pressure from the workpiece is added to the protector, the first elastic member contracts faster than the second elastic member, and wherein the protector is made of metal with high pyroconductivity and the protector is configured to conduct a heat of the workpiece to the thermocouple by contacting the workpiece.

4. The temperature measuring device according to claim 3, further comprising:
an adjuster for adjusting a distance between a molding surface of the mold and the thermocouple,
wherein when the temperature measuring device is attached to the mold, the adjuster is used to arrange the thermocouple to project by a predetermined length from the molding surface.

\* \* \* \* \*